United States Patent [19]

Ouhadi et al.

[11] Patent Number: 5,843,577

[45] Date of Patent: *Dec. 1, 1998

[54] THERMOPLASTIC ELASTOMERS HAVING IMPROVED SURFACE PROPERTIES

[75] Inventors: Trazollah Ouhadi, Liege; Jacques Horrion, Tilff, both of Belgium

[73] Assignee: Advanced Elastomer Systems, L.P., Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 714,061

[22] PCT Filed: Mar. 22, 1995

[86] PCT No.: PCT/EP95/01065

§ 371 Date: Sep. 11, 1996

§ 102(e) Date: Sep. 11, 1996

[87] PCT Pub. No.: WO95/26380

PCT Pub. Date: Oct. 5, 1995

[30] Foreign Application Priority Data

Mar. 29, 1994 [EP] European Pat. Off. .............. 94104942

[51] Int. Cl.⁶ .................................................. C08L 23/26
[52] U.S. Cl. .................................. 428/474.7; 428/474.9; 428/476.1; 428/476.9; 525/66; 525/92 B; 525/179; 525/184
[58] Field of Search ..................................... 525/66, 92 B, 525/179; 428/474.7, 474.9

[56] References Cited

U.S. PATENT DOCUMENTS 5,003,003 3/1991 Olivier ........................................ 525/66
5,155,159 10/1992 Ohmae ....................................... 525/66
5,270,377 12/1993 Otawa ........................................ 525/66
5,312,867 5/1994 Mitsuno ..................................... 525/66
5,574,105 11/1996 Vonkataswamy ....................... 525/179

FOREIGN PATENT DOCUMENTS 0409580 1/1991 European Pat. Off. .

*Primary Examiner*—Patricia A. Short
*Attorney, Agent, or Firm*—William A. Skinner

[57] ABSTRACT

Thermoplastic elastomers having improved surface properties are provided by incorporating a copolymer of a functionalized polyolefin and a polyamide into a thermoplastic elastomer selected from (A)
(a) a thermoplastic polyolefin homopolymer or copolymer, and
(b) an olefinic rubber which is fully crosslinked, partially crosslinked or not crosslinked, and optionally
(c) common additives;

(B)
(a) a block-copolymer of styrene/conjugated diene/styrene and/or its hydrogenated derivative, optionally compounded with
(b) a thermoplastic polyolefin homopolymer or copolymer and/or
(c) common additives and (C) any blend of (A) and (B).

The invention further relates to a process of making these modified thermoplastic elastomers, their use and shaped articles comprising them.

10 Claims, No Drawings

THERMOPLASTIC ELASTOMERS HAVING IMPROVED SURFACE PROPERTIES

BACKGROUND OF THE INVENTION

1. Field of the Invention

This invention relates to thermoplastic elastomers (TPE) having improved surface properties, particularly adhesion to engineering resins such as nylon. A thermoplastic elastomer is generally defined as a polymer or blend of polymers that can be processed and recycled in the same way as a conventional thermoplastic material, yet has properties and performance similar to that of vulcanized rubber at service temperatures. Blends or alloys of plastic and elastomeric rubber have become increasingly important in the production of high performance thermoplastic elastomers, particularly for the replacement of thermoset rubber in various applications.

2. Description of the Related Art

Polymer blends which have a combination of both thermoplastic and elastic properties are generally obtained by combining a thermoplastic polyolefin with an elastomeric composition in a way such that the elastomer is intimately and uniformly dispersed as a discrete particulate phase within a continuous phase of the thermoplastic. Early work with vulcanized compositions is found in U.S. Pat. No. 3,037,954 which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition is a microgel dispersion of cured elastomer, such as butyl rubber, chlorinated butyl rubber, polybutadiene or polyisobutene in an uncured matrix of thermoplastic polymer such as polypropylene.

In U.S. Pat. No. 32,028 (reissued) polymer blends comprising an olefin thermoplastic resin and an olefin copolymer rubber are described, wherein the rubber is dynamically vulcanized to a state of partial cure. The resulting compositions are reprocessible.

U.S. Pat. Nos. 4,130,534 and 4,130,535 disclose thermoplastic elastomer compositions comprising butyl rubber and polyolefin resin, and olefin rubber and polyolefin resin, respectively. The compositions are prepared by dynamic vulcanization and the rubber component is cured to the extent that it is essentially insoluble in conventional solvents. No details are given regarding adhesion properties.

U.S. Pat. No. 4,350,750 teaches the improvement of olefin polymers by modification of the olefin polymer, preferably a thermoplastic olefin polymer by reaction with a substituted maleamic acid of the formula

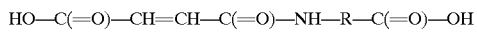

HO—C(=O)—CH=CH—C(=O)—NH—R—C(=O)—OH in which R is a straight or branched alkylene radical of 1–18 carbon atoms, or

(HO—C(=O)—CH=CH—C(=O)—NH—)$_2$R'$_n$ in which n is zero or one and R' is a straight or branched alkylene radical of 2–18 carbon atoms or arylene of 1–12 carbon atoms.

The olefin polymers comprise amorphous or crystalline essentially saturated homopolymers or copolymers of $C_2$–$C_8$ alpha monoolefins.

U.S. Pat. No. 4,728,692 discloses a thermoplastic elastomer composition comprising (A) 10 to 90 parts by weight of crystalline polyolefin such as polypropylene, (B) 10 to 90 parts by weight of halogenated butyl rubber (with the total amount of (A) and (B) being 100 parts by weight), (C) 10 to 120 parts by weight of olefin copolymer rubber, (D) 1 to 90 parts by weight of modified polyolefin, and optionally (E) 2 to 50 parts by weight of nitrile rubber, said composition being partially crosslinked in the presence of a crosslinking agent of a metal oxide and/or a metal chloride.

The modified polyolefin (D) includes those which are formed by adding an unsaturated carboxylic acid or a derivative thereof to a polyolefin, e.g. homopolymers of alpha-olefins such as ethylene, propylene, 1-butene, 1-hexene, and 4-methyl-1-pentene, and copolymers of ethylene with one or more alpha-olefins.

Examples of the unsaturated carboxylic acid include maleic acid, endo-bicyclo-[2.2.1]-5-heptene-2,3-dicarboxylic acid, itaconic acid, fumaric acid, acrylic acid, and methacrylic acid or their anhydride-, amide-, or ester derivative.

Component (D) in said composition functions as a binder which makes the individual components in the composition compatible/miscible with one another.

U.S. Pat. No. 4,957,968 discloses an adhesive thermoplastic elastomer composition comprising three major components as follows:

(a) at least one polyolefin modified by a chemically reactive functional group such as a carboxylic acid or its derivatives including anhydride, acid chloride, isocyanate, oxazoline, epoxide, amine and hydroxide;
(b) at least one other polymer prepared from one or more of the following: ethylene, propylene, butylene, isobutylene, octene-1, 4 methyl pentene-1, hexene-1 or mixtures; and
(c) at least one olefinic elastomer, including elastomeric ethylene-propylene copolymers, elastomeric ethylene-propylene terpolymers, polyisoprene, polyisobutylene, ethylene-propylene copolymer rubber, polybutadiene, natural rubber, elastomeric polyester, polyurethane elastomers, polyamide elastomers and mixtures.

The adhesive thermoplastic elastomer has adhesion to various metals, such as aluminum, stainless steel, copper, tin plated steel, and chrome plated steel, polyolefins, elastomers and polar polymers.

In U.S. Pat. No. 5,157,081 a dynamically vulcanized blend is described comprising a first butyl rubber based elastomer and a second ethylene-propylene polymer elastomer in a matrix of polyolefinic resin. No details are given regarding adhesion properties.

SUMMARY OF THE INVENTION

The present invention is based on the discovery that a thermoplastic elastomer composition having improved surface properties particularly adhesion to resins is provided by incorporating certain types of maleated polypropylene and polyamide or copolymers thereof into a blend of crystalline polyolefin homopolymer or copolymer and olefinic rubber.

In detail the present invention relates to a thermoplastic elastomer composition comprising 100 parts by weight of a thermoplastic elastomer selected from (A)
  (a) a thermoplastic polyolefin homopolymer or copolymer, and
  (b) an olefinic rubber which is fully crosslinked, partially crosslinked or not crosslinked, and optionally
  (c) common additives;

(B)
  (a) a block-copolymer of styrene/conjugated diene/styrene and/or its hydrogenated derivative, optionally compounded with (b) a thermoplastic polyolefin homopolymer or copolymer and/or (c) common additives and (C) any blend of (A) and (B)

about 3 to about 60 phr (parts per hundred weight parts of resin), based on the total weight of (A), (B), or (C), of (i) a copolymer obtainable by condensation reaction of about 10 to about 90 weight % of a functionalized polyolefin with
about 90 to about 10 weight % of a polyamide, based on the total weight of functionalized polyolefin and polyamide, or (ii) a functionalized polyolefin and a polyamide in the amounts defined under (i) or (iii) a mixture of (i) and (ii), under the proviso that the functionalized polyolefin contains no less than about 0.3 weight %, based on the total weight of the functionalized polyolefin, of functional group-forming monomers.

DESCRIPTION OF THE PREFERRED EMBODIMENTS

I. Thermoplastic Elastomer (A)

Polyolefin

Polyolefins suitable for use in the compositions (A), (B) or (C) of the invention include thermoplastic, crystalline polyolefin homopolymers and copolymers. They are desirably prepared from monoolefin monomers having about 2 to about 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferred, however, are monomers having about 3 to about 6 carbon atoms, with propylene being preferred. As used in the specification and claims the term polypropylene includes homopolymers of propylene as well as reactor copolymers of polypropylene which can contain about 1 to about 20 wt % of ethylene or an α-olefin comonomer of about 4 to about 16 carbon atoms, and mixtures thereof. The polypropylene can be highly crystalline isotactic or syndiotactic polypropylene. Commercially available polyolefins may be used in the practice of the invention. Further polyolefins which can be used in terms of the invention are high, low, linear-low, very low density polyethylenes and copolymers of ethylene with (meth) acrylates and/or vinyl acetates.

The amount of polyolefin found to provide useful compositions (A) is generally from about 8 to about 90 weight percent, under the proviso that the total amount of polyolefin (a) and rubber (b) is at least about 35 weight percent, based on the total weight of the polyolefin (a), rubber (b) and optional additives (c). Preferably, the polyolefin content will range from about 10 to about 60 percent by weight.

The thermoplastic polyolefins homopolymers or copolymers which can optionally be used in the thermoplastic elastomer composition (B) are selected from the same polyolefins as mentioned above. The amount of the polyolefins used in composition (B) can be up to about 60 weight %, based on the total amount of composition (B).

Olefinic Rubber

Suitable monoolefin copolymer rubbers comprise nonpolar, rubbery copolymers of two or more α-monoolefins, preferably copolymerized with at least one polyene, usually a diene.

Saturated monoolefin copolymer rubber, for example ethylene-propylene copolymer rubber (EPM) can be used. However, unsaturated monoolefin rubber such as EPDM rubber is more suitable. EPDM is a terpolymer of ethylene, propylene and a non-conjugated diene. Satisfactory non-conjugated dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene and dicyclopentadiene (DCPD).

Butyl rubbers are also useful in the compositions of the invention. As used in the specification and claims, the term "butyl rubber" includes copolymers of an isoolefin and a conjugated monoolefin, terpolymers of an isoolefin with or without a conjugated monoolefin, divinyl aromatic monomers and the halogenated derivatives of such copolymers and terpolymers.

The useful butyl rubber copolymers comprise a major portion of isoolefin and a minor amount, usually less than about 30 wt %, of a conjugated multiolefin. The preferred copolymers comprise about 85–99.5 wt % of a $C_{4-7}$ isoolefin such as isobutylene and 15–0.5 wt % of a multiolefin of about 4–14 carbon atoms, such as isoprene, butadiene, dimethyl butadiene and piperylene. Commercial butyl rubber, chlorobutyl rubber, bromobutyl rubber, useful in the invention, are copolymers of isobutylene and minor amounts of isoprene with less than about 3% halogen for the halobutyl-derivatives. Other butyl co- and terpolymer rubbers are illustrated by the description in U.S. Pat. No. 4,916,180.

Another suitable copolymer within the scope of the olefinic rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from about 0.1 to 10 wt %. A preferred example is the brominated copolymer of isobutylene and para-methylstyrene. These copolymers are more fully described in U.S. Pat. No. 5,162,445.

A further olefinic rubber suitable in the invention is natural rubber. The main constituent of natural rubber is the linear polymer cis-1,4-polyisoprene. It is normally commercially available in the form of smoked sheets and crepe. Synthetic polyisoprene can also be used. Furthermore polybutadiene rubber and styrene-butadiene-copolymer rubbers can also be used.

Blends of any of the above olefinic rubbers can be employed, rather than a single olefinic rubber.

Further suitable rubbers are nitrile rubbers. Examples of the nitrile group-containing rubber include a copolymer rubber comprising an ethylenically unsaturated nitrile compound and a conjugated diene. Further, the copolymer rubber may be one in which the conjugated diene units of the copolymer rubber are hydrogenated.

Specific examples of the ethylenically unsaturated nitrile compound include acrylonitrile, α-chloroacrylonitrile, α-fluoroacrylonitrile and methacrylonitrile. Among them, acrylonitrile is particularly preferable.

Examples of the conjugated diene include 1,3-butadiene, 2-chlorobutadiene and 2-methyl-1,3-butadiene (isoprene). Among them, butadiene is particularly preferable.

Especially preferred nitrile rubbers comprise copolymer of 1,3-butadiene and about 10 to about 50 percent of acrylonitrile.

Another suitable rubber in terms of the present invention are based on polychlorinated butadienes such as polychloroprene rubber. These rubbers are commercially available under the trade names Neoprene® and Bayprene®.

In preparing the compositions of the invention, the amount of olefinic rubber in composition (A) generally ranges from about 70 to about 10 weight percent, under the proviso that the total amount of polyolefin (a) and rubber (b) is at least about 35 weight %, based on the weight of the polyolefin (a), the rubber (b) and the optional additives (c). Preferably, the olefinic rubber content will be in the range of from about 50 to about 10 weight percent.

II. Thermoplastic Elastomer (B)

The thermoplastic elastomer (B) is a block-copolymer of styrene/conjugated diene/styrene, its hydrogenated derivative or mixtures thereof. Generally this block-copolymer may contain about 10 to about 50 weight %, more preferably about 25 to about 35 weight % of styrene and about 90 to about 50 weight %, more preferably about 75 to about 35 weight % of the conjugated diene, based on said block-copolymer. Most preferably, however, is a block-copolymer which contains about 30 weight % of styrene and about 70 weight % of the conjugated diene. The conjugated diene is selected from butadiene, isoprene or mixtures thereof. These block-copolymers are known in the art and are commercially available.

Optionally the block-copolymer may further be compounded with a polyolefin or a common additive or mixtures thereof.

The thermoplastic elastomer (B) may thus optionally further comprise up to about 60 weight % of (b) the thermoplastic polyolefin homopolymer or copolymer or the additives or mixtures thereof, based on the total weight of the block-copolymer (a) and (b). The thermoplastic polyolefins are selected from those mentioned above in context with the thermoplastic elastomer (A).

III. Thermoplastic Elastomer (C)

Another thermoplastic elastomers which can be modified with modifier mentioned herein below are blends of the thermoplastic elastomer (A) comprising the polyolefin, rubber and optionally additives with the thermoplastic elastomer (B) comprising the block-copolymer, optionally polyolefins and/or additives.

Preferred blends (C) contain about 5 to about 95 weight % of (A) and about 95 to about 5 weight % of (B) respectively, based on the total amount of (A) and (B). These blends can be prepared by common blending-processes known in the art.

Additives

In addition to the polyolefin, rubber and copolymer components, the compositions of the invention (A) and (B) include curatives and may also include reinforcing and non-reinforcing fillers, plasticizers, antioxidants, stabilizers, rubber processing oil, extender oils, lubricants, anti-blocking agents, antistatic agents, waxes, foaming agents, pigments, flame retardants and other processing aids known in the rubber compounding art. Such additives can comprise up to about 65 wt % of the total composition of polyolefins (a), rubber (b) and additives (c). Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The type of the oil will be that ordinarily used in conjunction with the specific rubber or rubbers present in the composition.

Modifier

The presence of a copolymer of functionalized polyolefin and polyamide improves the surface properties and particularly the property of adhesion to engineering resins, glass and metals such as steel, copper, aluminum or titanium. Thus, such a copolymer can be used as adhesion promoter in polyolefinic thermoplastic elastomers. The copolymers of functionalized polyolefins and polyamides can be prepared by condensation reaction of functionalized polyolefins and polyamides. This type of reaction is known to those skilled in the art (F. Ide and A. Hasegawa, *J. Appl. Polym. Sci.,* 18 (1974) 963; S. Hosoda, K. Kojima, Y. Kanda and M. Aoyagi, *Polym. Networks Blends,* 1 (1991) 51; S. J. Park, B. K. Kim and H. M. Heong, *Eur. Polym. J.,* 26 (1990) 131). The reactions described in these references can easily be transferred to the other functionalized polyolefins mentioned below.

The polyolefins of the functionalized polyolefins can be homopolymers of alpha-olefins such as ethylene, propylene, 1-butene, 1-hexene, and 4-methyl-1-pentene, and copolymers of ethylene with one or more alpha-olefins. Preferable among the polyolefins are low-density polyethylene, linear low-density polyethylene, medium- and high-density polyethylene, polypropylene, and propylene-ethylene random or block copolymers.

The functionalized polyolefins contain one or more functional groups which have been incorporated during polymerization. However they are preferably polymers onto which the functional groups have been grafted. Such functional group-forming monomers are preferably carboxylic acids, dicarboxylic acids or their derivatives such as their anhydrides.

Examples of the unsaturated carboxylic acids, dicarboxylic acids which may be present in the functionalized polyolefin are those having about 3 to about 20 carbon atoms per molecule such as acrylic acid, methacrylic acid, maleic acid, fumaric acid and itaconic acid.

Unsaturated dicarboxylic acids having about 4 to about 10 carbon atoms per molecule and anhydrides thereof, are the especially preferred grafting monomers. These grafting monomers include for example, maleic acid, fumaric acid, itaconic acid, citraconic acid, cyclohex-4-ene-1,2-dicarboxylic acid, bicyclo[2.21]hept-5-ene-2,3-dicarboxylic acid, maleic anhydride, itaconic anhydride, citraconic anhydride, allylsuccinic anhydride, 4-methylcyclohex-4-ene-1,2-dicarboxylic anhydride and bicyclo[2.2.1]hept-5-ene-2,3-dicarboxylic anhydride.

Further grafting monomers are epoxy-group containing esters of unsaturated carboxylic acids containing at least about 6, preferably about 7 carbon atoms. Particularly preferred are glycidyl acrylate and glycidyl methacrylate.

Various known methods can be used to graft the grafting monomer to the basic polymer. For example, this can be achieved by heating the polymer and the grafting monomer at high temperatures of from about 150° to about 300° C. in the presence or absence of a solvent with or without a radical initiator. Another vinyl monomer may be present during the grafting reaction. Suitable solvents that may be used in this reaction include benzene, toluene, xylene, chlorobenzene and cumene. Suitable radical initiators that may be used include t-butyl hydroperoxide, diisopropylbenzene hydroperoxide, di-t-butyl peroxide, t-butyl cumyl peroxide, acetyl peroxide, benzoyl peroxide, isobutyryl peroxide and methyl ethyl ketone peroxide.

In the functionalized polyolefin thus obtained, the amount of the acid or anhydride is preferably about 0.3 to about 10 %, more preferably about 0.3 to about 5%, and most preferably at least about 1 weight %, based on the weight of the functional polyolefin.

The polyamides are preferably selected from polymers of ε-caprolactam, aminocaproic acid, enantholactam, 7-aminoheptanoic acid, 11-aminoundecanoic acid, etc., or polymers obtained by polycondensation of diamines (such as butanediamine, hexamethylenediamine, nonamethylenediamine, undecamethylenediamine, dodecamethylenediamine, m-xylenediamine, etc) with dicarboxylic acids (such as terephthalic acid, isophthalic acid, adipic acid, sebacic acid, dodecanedibasic acid, glutaric acid, etc.), copolymers thereof or blends thereof. Specific examples include aliphatic polyamide resins (such as polyamide 4.6, polyamide 6, polyamide 6.6, polyamide 6.10, polyamide 11, polyamide 12, and polyamide 6.12) and aromatic polyamide resins (such as poly (hexamethylenediamine terephthalamide), poly (hexamethylene isophthalamide), xylene group-containing polyamides and amorphous polyamide). Among them, polyamide 6, polyamide 6.6, and polyamide 12 are preferable.

It has to be noted that the copolymer of the functionalized polyolefin and the polyamide can first be prepared as such (e.g. in a twin screw extruder) and then melt-mixed or dry-blended with the thermoplastic elastomer composition before processing. Alternatively the functionalized polyolefin and polyamide can be melt mixed with the thermoplastic elastomer composition in one step. This melt-mixing can be made either on down-stream during manufacturing of the thermoplastic elastomer or in a second pass in a Banbury, single or double screw extruder.

Preferably the amount of the functionalized polyolefin is about 20 to about 70 weight % and the amount of the polyamide is about 80 to about 30 weight %. Most preferably, however, the amount of the functionalized polyolefin is about 30 to about 60 weight % and the amount of the polyamide is about 70 to about 40 weight %, all amounts based on the total weight of the functionalized polyolefin and polyamide.

The amount of copolymer (for brevity "PO-g-PA") obtainable by the reaction of functionalized polyolefin and the polyamide in the thermoplastic elastomer ("TPE"), whether added to the elastomer as the copolymer or as the reactants as above described is between about 3 and about 60 phr, preferably about 5 to about 40 phr, based on the thermoplastic elastomer (A), (B) or (C).

It has surprisingly been found that a thus modified thermoplastic elastomer (A), (B) or (C) has improved surface properties. In detail the adhesion thereof to engineering resins such as polyamides (nylon etc.) and furthermore the adhesion to glass, and metals such as steel, copper aluminum or titanium is significantly improved, and the adhesion performance of the addition of PO-g-PA is much higher than with the addition of a functionalized polyolefin, such as functionalized polypropylene, e.g. maleated polypropylene alone, when these additives are used at a comparative level. Furthermore it has been found that by the addition of low levels, i.e. about 5 to about 15 phr of PO-g-PA to the soft thermoplastic elastomer good physical properties were obtained. For further details it is referred to Tables 2 to 6 in which the influence of different PO-g-PA for the polyamide Santoprene®-rubber is described in more detail.

Maleated polypropylene (MHA-PP) containing about 1.5 wt % of maleic acid anhydride (MHA) grafted thereon added to a blend of polypropylene and fully cured EPDM and a common additive with a Durameter shore A hardness of 45 (Santoprene® 111-45, commercially available from Advanced Elastomer Systems, USA) alone at high level (15 wt %) showed non-cohesive adhesion performance to polyamide.

Processing

The olefin rubber component of the thermoplastic elastomer is generally present as small, i.e. micro-size, particles within a continuous polyolefin matrix, although a co-continuous morphology or a phase inversion is also possible depending on the amount of rubber relative to plastic with or without rubber curing, and the cure system or if the rubber is cured, the degree of cure of the rubber. The rubber is desirably partially crosslinked (cured), and preferably fully crosslinked or optionally non-cured.

The partial or full crosslinking can be achieved by adding an appropriate rubber curative to the blend of polyolefin and rubber and vulcanizing the rubber to the desired degree under conventional vulcanizing conditions. However, it is preferred that the rubber be crosslinked by the process of dynamic vulcanization. As used in the specification and claims, the term "dynamic vulcanization" means a vulcanization or curing process for a rubber contained in a thermoplastic elastomer composition, wherein the rubber is vulcanized under conditions of high shear at a temperature above the melting point of the polyolefin component. The rubber is thus simultaneously crosslinked and dispersed as fine particles within the polyolefin matrix, although as noted above other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. The unique characteristic of dynamically cured compositions is that, notwithstanding the fact that the rubber component is partially or fully cured, the compositions can be processed and reprocessed by conventional plastic processing techniques such as extrusion, injection molding and compressing molding. Scrap or flashing can be salvaged and reprocessed.

Those ordinarily skilled in the art will appreciate the appropriate quantities, types of cure systems and vulcanization conditions required to carry out the vulcanization of the rubber. The rubber can be vulcanized using varying amounts of curative, varying temperatures and varying time of cure in order to obtain the optimum crosslinking desired. Preferably, after the resin and rubber are intimately mixed, curative is added. Heating and masticating at vulcanization temperatures are generally adequate to complete the vulcanization reaction in a few minutes or less, but if shorter vulcanization times are desired, higher temperatures may be used. A suitable range of vulcanization temperatures is from about the melting temperature of the polyolefin resin (about 120° C. in the case of polyethylene and about 175° C. in the case of polypropylene) to about 250° C. or more; typically, the range is from about 150° C. to about 225° C. A preferred range of vulcanization temperatures is from about 180° C. to about 220° C. To obtain thermoplastic vulcanizates, it is important that mixing continues without interruption until vulcanization occurs. If appreciable curing is allowed after mixing has stopped, a thermoset unprocessable vulcanizate may be obtained.

Any known cure system for the rubber can be used, so long as it is suitable under the vulcanization conditions with the specific olefinic rubber or combination of rubbers being used and with the polyolefin. These curatives include sulfur, sulfur donors, metal oxides, resin systems, peroxide-based systems and the like, both with and without accelerators and co-agents. Preferably for curing the halobutyl-rubber and the halogenated copolymer of isobutylene and para-methylstyrene are bis-maleimide-based vulcanizing systems, such as n-phenylene bis-maleimide. Such cure systems are well known in the art and literature of vulcanization of elastomers, e.g. from U.S. Pat. No. 3,806,558 and U.S. Pat. No. 5,021,500.

The terms "fully vulcanized" and "completely vulcanized" as used herein means that the rubber component to be vulcanized has been cured to a state in which the elastomeric properties of the crosslinked rubber are similar to those of the rubber in its conventional vulcanized state, apart from the thermoplastic elastomer composition. The degree of cure can be described in terms of gel content or, conversely, extractable components. Alternatively the degree of cure may be expressed in terms of crosslink density. All of these descriptions are well known in the art, for example from U.S. Pat. Nos. 5,100,947 and 5,157,081.

The thermoplastic elastomer which does not contain the modifier can be made by mixing the rubber with the polyolefin and the optional additives, without any crosslinking agents as described above.

The following general procedure was used in the preparation of thermoplastic elastomers of the invention as set forth in the examples. The thermoplastic elastomer and an appropriate portion of the functionalized polyolefin and polyamide and/or copolymer thereof are mixed in single or twin screw extruder or conventional internal mixer. The mixture is heated to a temperature sufficient to melt the polyamide component. In order to accomplish this the mixture was heated to a temperature of about 20° C. above the melting point of the respective polyamide used as such or as copolymer with the functionalized polyolefins.

Another way to make the TPE of the invention is by dry-blending of the thermoplastic elastomer with an appropriate portion of the functionalized polyolefin and/or copolymer thereof.

The modified thermoplastic elastomer of the present invention can be used in processes for making shaped articles by conventional processing such as co-injection, co-extrusion, co-blow-molding (injection and extrusion), lamination, calandering, overmolding by injection and compression, and over-extrusion. The thus obtainable shaped articles is a multilayer article comprising at least one layer of an engineering resin, such as a polyamide, glass or a metal and at least one layer of the modifier thermoplastic elastomer composition according to the invention.

The invention will be better understood by reference to the following examples which serve to illustrate but not limit the present invention.

EXAMPLES

The following abbreviations were used in the following text and tables:

PO-g-PA: reaction product of a functionalized polyolefin with a polyamide (PA)
PP-g-PA: reaction product of maleated polypropylene with a polyamide
MHA-PP: maleated polypropylene containing about 1.5% by weight of maleic acid anhydride (1.1% grafted, 0.4% free)
TPE: thermoplastic elastomer
Admer QF551: maleated polypropylene containing about 0.4% by weight of maleic acid anhydride
S 111-45: Santoprene® rubber (blend of polypropylene and fully cured EPDM and a common additive with a Durameter shore A hardness of 45)

The TPE and the functionalized polyolefin and polyamide and/or copolymer thereof are blended in a twin screw extruder at a screw speed of about 100 rpm and a temperature-profile of about 160° to about 240° C. The final composition can be pelletized using an under-water pelletizer.

The adhesion between the thermoplastic elastomers of the invention and (Ultramid B3 from BASF) and PA 66 (Technyl A216, trademark of Rhone-Poulenc Plastiques Tech.) was evaluated by using a bi-injection molding machine or by compression molding.

The temperature of the processing (co-injection or compression molding) is between about 220° C. to about 280° C., depending on the type of polyamide.

The article made using the co-injection process has PA6 as core and the modified thermoplastic elastomer of the invention as soft skin. The efficiency of the adhesion between the TPE of the invention and the polyamide was evaluated using 7.5 to 15 weight % of the PO-g-PA or the respective components of the PO-g-PA.

TABLE 1

Composition of different PP-g-PA made separately in a twin screw extruder by reacting MHA-PP and PA

| PP-g-PA | Type of MHA-PP | Type of PA |
|---|---|---|
| PP-g-PA 1 | MHA-PP (1.5% MHA); 50% | Ultramid KR 4405 (PA6, Mn = 15000); 50% |
| PP-g-PA 2 | MHA-PP (1.5% MHA); 50% | Ultramid C 35 (copolymer PA6/PA66); 50% |
| PP-g-PA 3 | MHA-PP (1.5% MHA); 50% | Ultramid B 4 (PA6, Mn = 33000); 50% |
| PP-g-PA 4 | MHA-PP (1.5% (MHA); 50% | Ultramid B 3 (PA6, Mn = 18000); 50% |
| PP-g-PA 5 | MHA-PP (1.5% MHA); 40% | Ultramid B 3 (PA6); 60% | note: PA6 = polyamide made from ε-caprolactam

PA66 = polyamide copolymer of hexamethylene diamine and adipic acid

Ultramid = trade name of BASF AG, Germany

Mn = number average molecular weight

TABLE 2

Adhesion of dry-blended TPE to polyamide PA 6 on the article made by co-injection molding

|  | Comparative 1 | Run 1 | Run 2 | Run 3 | Run 4 | Comparative 2 | Comparative 3 |
|---|---|---|---|---|---|---|---|
| S 111-45 (TPE) | 100 | 85 | 85 | 85 | 85 | 85 | 85 |
| PP-g-PA 1 |  | 15 | — | — | — | — | — |
| PP-g-PA 2 |  | — | 15 | — | — | — | — |
| PP-g-PA 3 |  | — | — | 15 | — | — | — |
| PP-g-PA 4 |  | — | — | — | 15 | — | — |
| MHA-PP |  |  |  |  |  | 15 | — |
| Admer QF551(MHA-PP) |  |  |  |  |  |  | 15 |
| Adhesion | none | cohesive | cohesive | cohesive | cohesive | non-cohesive | none |
| Hardness (sh A) (5 sec.) | 49 | 66 | 66 | 68 | 65 | 76 |  |

TABLE 3

Adhesion of the TPE (melt-mixed) to polyamide PA 6 on the article made by co-injection molding

|  | Run 5 | Run 6 | Run 7 | Run 8 | Comparative 4 | Run 9 |
|---|---|---|---|---|---|---|
| S 111-45 (TPE) | 92.5 | 92.5 | 92.5 | 92.5 | 92.5 | 92.5 |
| PP-g-PA 1 | 7.5 | — | — | — | — | — |
| PP-g-PA 2 | — | 7.5 | — | — | — | — |
| PP-g-PA 3 | — | — | 7.5 | — | — | — |
| PP-g-PA 4 | — | — | — | 7.5 | — | — |
| MHA-PP |  |  |  |  | 7.5 | 3.75 |
| PA6 (Ultramide B 3) |  |  |  |  |  | 3.75 |
| Adhesion | cohesive | cohesive | cohesive | cohesive | non-cohesive | cohesive |
| Hardness (sh A) (5 sec.) | 62 | 61 | 62 | 62 |  | 61 |

TABLE 4

Adhesion of the TPE (dry-blended) to polyamide PA 6 on the article made by co-injection molding

|  | Comparative 5 | Run 10 | Run 11 | Run 12 | Run 13 |
|---|---|---|---|---|---|
| S 111-45 (TPE) | 92.5 | 92.5 | 92.5 | 92.5 | 92.5 |
| PP-g-PA 1 | — | 7.5 | — | — | — |
| PP-g-PA 2 | — | — | 7.5 | — | — |
| PP-g-PA 3 | — | — | — | 7.5 | — |
| PP-g-PA 4 | — | — | — | — | 7.5 |
| MHA-PP | 7.5 |  |  |  |  |
| Adhesion | non-cohesive | cohesive | cohesive | cohesive | cohesive |

TABLE 5

Physical properties of thermoplastic elastomers of the invention

|  | Run 14 | Run 15 | Run 16 | Run 17 |
|---|---|---|---|---|
| S 111-45 (TPE) | 92.5 | 92.5 | 92.5 | 92.5 |
| PP-g-PA 1 | 7.5 | — | — | — |
| PP-g-PA 2 | — | 7.5 | — | — |
| PP-g-PA 3 | — | — | 7.5 | — |
| PP-g-PA 4 | — | — | — | 7.5 |
| Hardness (sh A)(5 sec.) | 62 | 61 | 62 | 62 |
| Direction 115 mm |  |  |  |  |
| Mod. 100 (MPa) | 2.5 | 2.5 | 2.4 | 2.4 |
| Mod. 300 (MPa) |  |  |  | 4.6 |
| Elongation (%) | 294 | 284 | 280 | 307 |
| Tensile (Mpa) | 4.7 | 4.7 | 4.5 | 4.7 |
| Tear (M/min) | 24 | 24 | 24 | 22 |
| direction 85 mm |  |  |  |  |

TABLE 6

Adhesion of the thermoplastic elastomers of the invention to polyamide PA 6 by injection-overmolding PA 6 on TPE of the invention

| | Composition | Adhesion Result |
|---|---|---|
| Run 18 | S 111-45 (85 wt %)/PP-g-PA5 (15 wt %) | cohesive |
| Comparative 6 | S 111-45 (80 wt %)/MHA-PP (20 wt %) | non-cohesive |

TABLE 7

Adhesion of the thermoplastic elastomers of the invention (melt-blended) to PA 66 made on article made by co-injection molding

| | Composition | Adhesion Result |
|---|---|---|
| Run 19 | S 111-55 (85 wt %)/PP-g-PA5 (15 wt %) | cohesive |

We claim:

1. A composition comprising
   (A) 100 parts by weight of a preformed thermoplastic elastomer comprising a thermoplastic polyolefin homopolymer or copolymer resin matrix having dispersed therein discrete particles of an olefinic rubber which has been at least partially cured by dynamic vulcanization, and optionally common additives, and
   (B) from about 3 to about 60 parts by weight, based on the weight of (A), of a modifier comprising a copolymer obtained by the condensation reaction of about 10 to about 90 weight percent of a functionalized polyolefin with about 90 to about 10 weight percent of a polyamide, based on the total weight of functionalized polyolefin and polyamide, with the proviso that the polyolefin of the functionalized polyolefin of (B) is selected from the group consisting of polymers of ethylene, propylene, 1-butene, 1-hexene, 4-methyl-1-pentene, and copolymers of ethylene with one or more alpha-olefins, and the functionalized polyolefin contains no less than about 0.3 weight percent, based on the total weight of the functionalized polyolefin, of functional group forming monomers.

2. The composition of claim 1 wherein the thermoplastic polyolefin resin of (A) is selected from a homopolymer or copolymer of a $C_{2-7}$ monoolefin monomer, or a copolymer thereof with (meth)acrylates and/or vinyl acetates.

3. The composition of claim 2 wherein the monoolefin monomer is selected from the group consisting of ethylene and propylene.

4. The composition of claim 1 wherein the olefinic rubber of (A) is selected from the group consisting of ethylene-propylene-diene rubber, ethylene-propylene rubber, butyl rubber, halogenated butyl rubber, copolymers of isomonoolefin and para-alkylstyrene or their halogenated derivatives, natural or synthetic rubber, polyisoprene polybutadiene rubber, styrene-butadiene-copolymer rubbers, nitrile rubbers, polychloroprene rubbers and mixtures thereof.

5. The composition of claim 1 wherein the olefinic rubber of (A) is fully crosslinked.

6. The composition of claim 1, wherein the functionalized polyolefin of the modifier is a polymer obtained by grafting to the polyolefin a grafting monomer selected from unsaturated carboxylic acids and dicarboxylic acids or their derivatives containing 3 to 20 carbon atoms, or epoxy-group containing esters of unsaturated carboxylic acids containing at least 6 carbon atoms.

7. The composition of claim 6, wherein the grafting monomer is glycidyl methacrylate.

8. The composition of claim 1, wherein the polyamide is selected from the group consisting of polymers of -caprolactam, aminocaproic acid, enantholactam, 7-aminoheptanoic acid, 11-aminoundecanoic acid, polymers obtained by polycondensation of diamines with dicarboxylic acids, copolymers thereof and blends thereof.

9. A shaped multi-layer article comprising at least one layer of a polyamide and at least one layer of the composition of claim 1.

10. A method for the preparation of an adhesive thermoplastic elastomer composition, comprising the steps of
    (A) preparing a composition comprising a thermoplastic elastomer comprising a thermoplastic polyolefin homopolymer or copolymer resin matrix having dispersed therein discrete particles of an olefinic rubber which has been at least partially cured by dynamic vulcanization, and optionally common additives, and
    (B) blending 100 parts by weight of the composition of (A) with about 3 to about 60 parts by weight of a modifier comprising a copolymer obtained by the condensation reaction of about 10 to about 90 weight percent of a functionalized polyolefin with about 90 to about 10 weight percent of a polyamide, based on the total weight of functionalized polyolefin and polyamide, at a temperature of about 20° C. above the melting point of the polyamide, with the proviso that the polyolefin of the functionalized polyolefin of (B) is selected from the group consisting of polymers of ethylene, propylene, 1-butene, 1-hexene, 4-methyl-1-pentene, and copolymers of ethylene with one or more alpha-olefins, and the functionalized polyolefin contains no less than about 0.3 weight percent, based on the total weight of the functionalized polyolefin, of functional group forming monomers.

* * * * *